United States Patent Office 2,710,731
Patented June 14, 1955

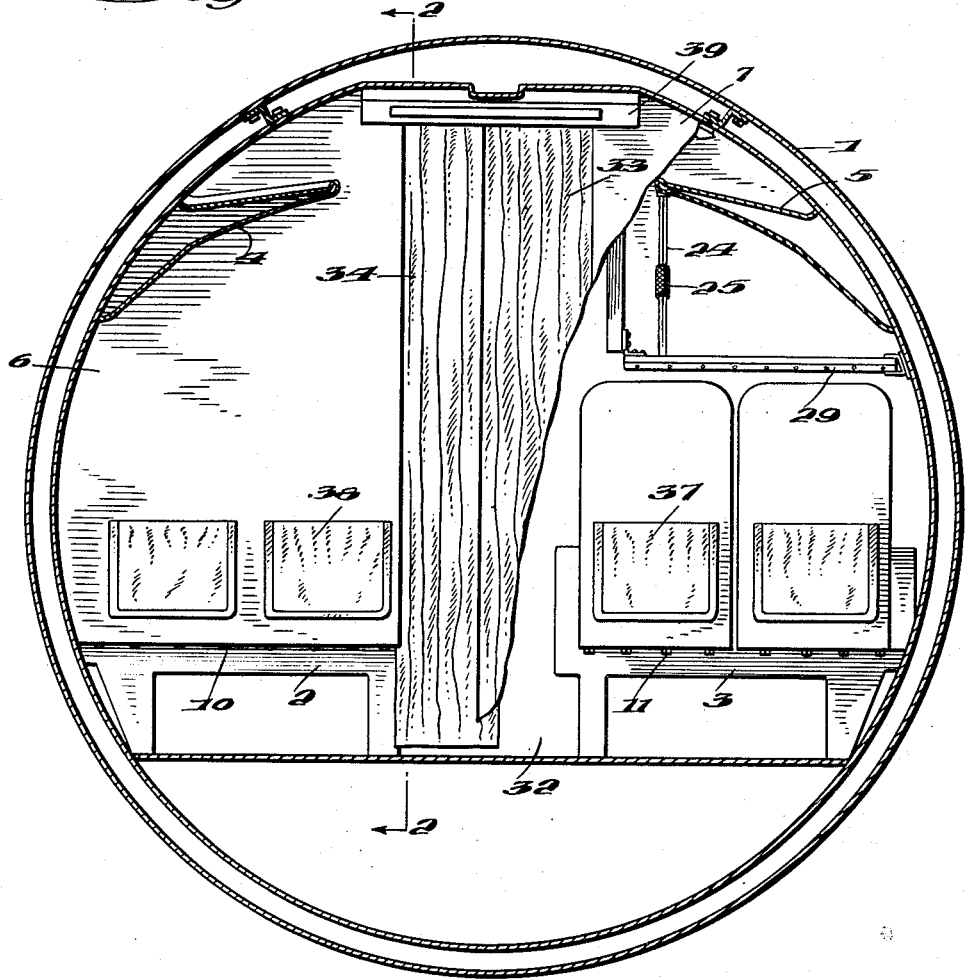
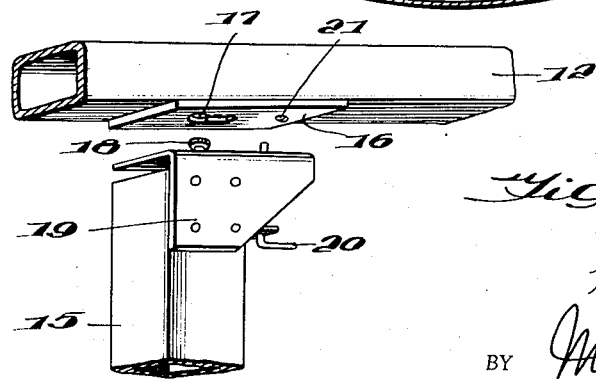

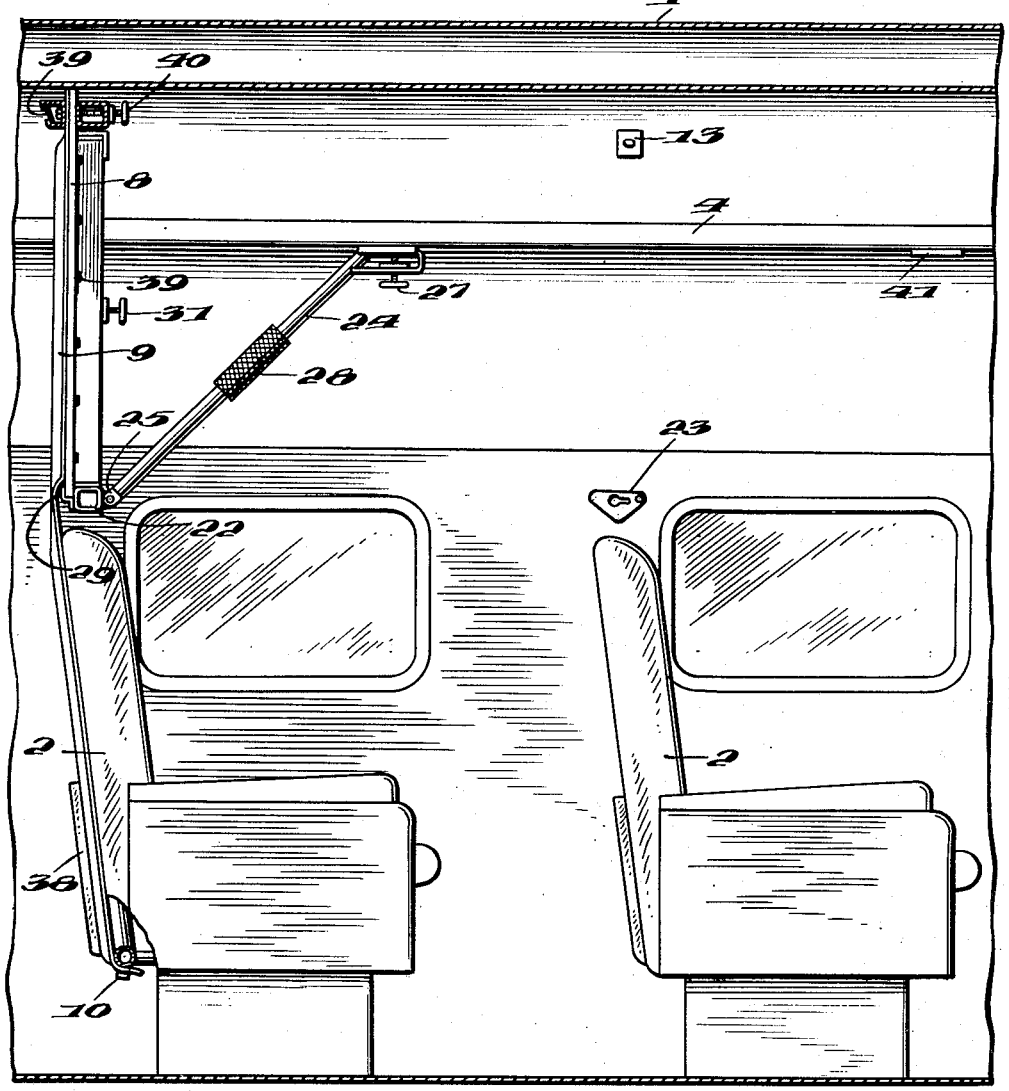
Fig. 2.

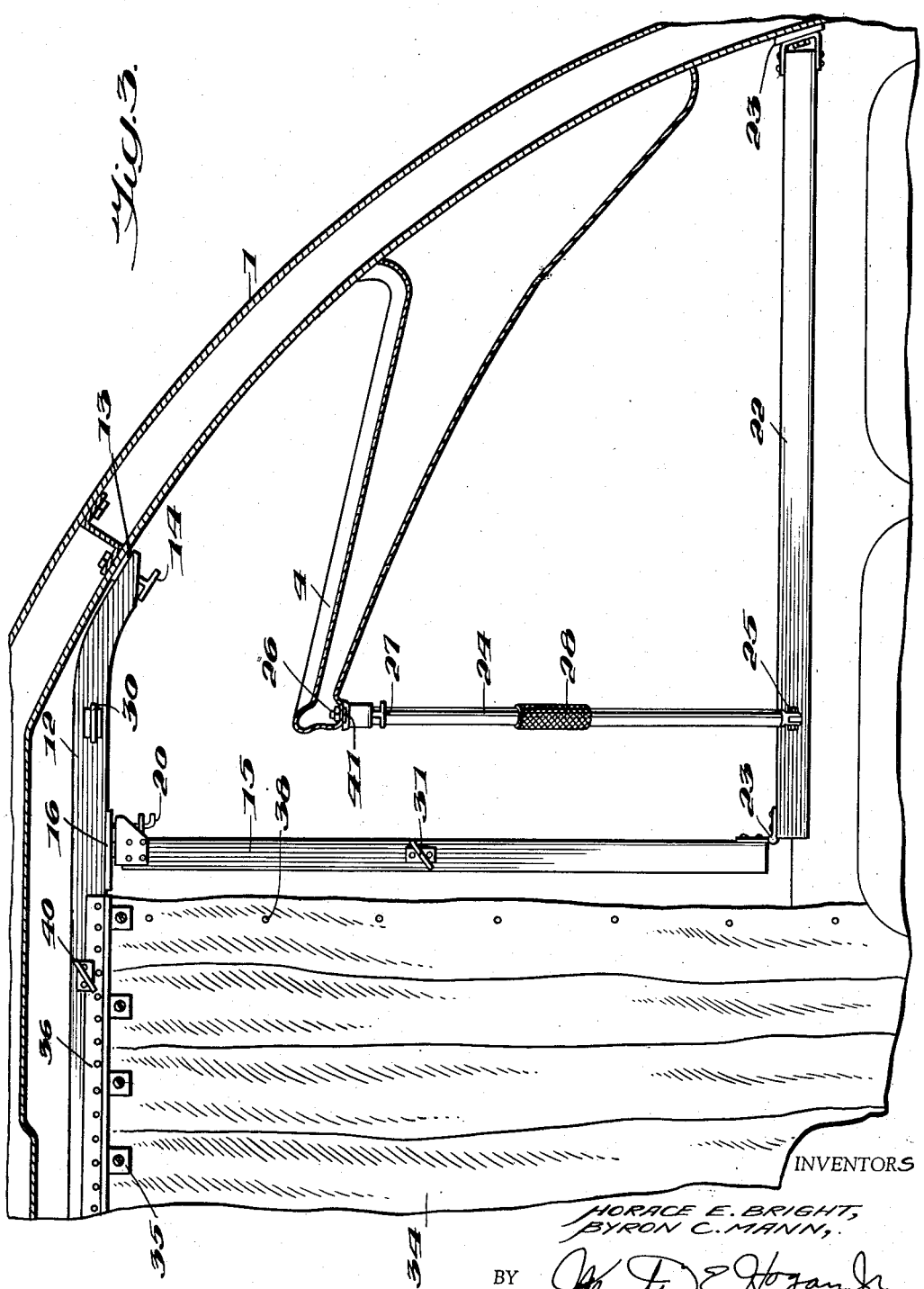

2,710,731

REMOVABLE BULKHEAD FOR AIRCRAFT

Horace E. Bright, Parkville, and Byron C. Mann, Middle River, Md., assignors to The Glenn L. Martin Company, Middle River, Md., a corporation of Maryland Application June 25, 1952, Serial No. 295,438

7 Claims. (Cl. 244—118)

This invention relates to removable bulkheads for passenger aircraft cabins and more particularly to a removable bulkhead which may be installed in any one of several alternate locations within a cabin.

In the operation of passenger aircraft it is frequently necessary to carry within the passenger cabin quantities of mail or other cargo. Such mail or cargo strewn about a passenger compartment is unsightly and offensive to the passengers since it presents an unattractive appearance and detracts from the decorative scheme of the cabin interior. To conceal such mail or cargo from the view of the passengers it is desirable to provide a removable bulkhead which may be installed to divide the cabin into two compartments, passengers preferably being seated aft of the bulkhead and the mail or cargo being stowed in the front. In order to preserve the decorative scheme of the passenger compartment any such bulkhead should harmonize with the color scheme and interior trim of the cabin, and should, in its preferred form, appear to be the actual forward bulkhead of the passenger compartment.

Since the cargo and passenger space requirements are variable, it is additionally desirable that any such bulkhead be constructed so that it may be installed in any one of several longitudinal locations so that the amount of cabin space allocated to passengers or cargo can be varied as desired. It is also an extremely desirable feature that such a bulkhead be capable of being installed or removed in a very short time, and since it may be necessary that such operations be performed by inexperienced personnel, the design of the bulkhead should be such that no tools are required for its installation or removal.

It is the object of this invention therefore to provide a readily and easily removable bulkhead for an aircraft cabin which may be installed in any one of several available positions within the cabin.

It is another object of this invention to provide such a bulkhead which will give the appearance of being the actual forward bulkhead of the passenger compartment.

It is a further object of this invention to provide a removable bulkhead which may be installed or relocated within the cabin entirely by hand, without the use of any tools, so that installation or removal may be accomplished easily and quickly by inexperienced personnel.

Further objects of this invention will become apparent from the following description taken in connection with the accompanying drawings.

In the drawings, Figure 1 is a cross-sectional view of a conventional aircraft cabin, taken looking forward and showing the bulkhead contemplated by this invention installed in position with a portion thereof cut away to partially reveal the supporting structure.

Figure 2 is a sectional view taken along line 2—2 of Figure 1 with the doorway curtain removed to show the details of the supporting brace structure.

Figure 3 is a partial view of the forward side of the bulkhead taken looking aft within the cabin.

Figure 4 is a partial perspective view showing the means utilized for connecting the vertical brace member of the supporting structure to the upper transverse member and for connecting the lower transverse member to the side wall of the cabin.

In Figure 1 there is shown an aircraft cabin 1 which may have a constant cross section throughout a substantial portion of its length. Contained within the cabin are rows of dual seats 2 and 3 extending along opposite sides thereof. Parcel racks 4 and 5 extend longitudinally along the side walls of the cabin on opposite sides directly above the rows of seats.

The bulkhead contemplated by this invention comprises left and right-hand partition members 6 and 7, the outer edges of which are contoured to fit snugly against the side walls of the cabin as may be seen in Figure 1. Each of the partitions, as shown in Figure 2, is composed of an upper plywood panel 8, the aft side of which is covered by a flexible padded panel 9 preferably composed of the same material used for the interior cabin trim. The flexible panel 9 extends downwardly to lie flat against the backs of the dual seats 2 and 3, the lower edge of the panel being fastened to the underside of the rear of the seats by means of snap fasteners 10 which fasten to a spaced row of snap studs 11 carried by the lower edge of the seats. To the aft side of the flexible panels 9 are attached a pair of pockets 38 which duplicate the pockets 37 provided on the rear side of seats 2 and 3 for the passenger's convenience, and which are covered up by the flexible portion 9 of the partitions 6 and 7.

The arrangement of the brace structure provided to support the partitions is shown in Figure 3, the right and left hand sides of the structure being identical but oppositely disposed, one side only being therefore shown in the drawing. The structure consists of an upper transverse member 12 attached to the upper inner wall of the cabin by means of thumbscrews 14, which are adapted to engage threaded plates 13 fixed to the cabin wall. Depending from the transverse member 12 is a vertical member 15 which is attached to the transverse member by means of a readily detachable fastener as is shown in Figure 4. The fastener arrangement consists of a lug 18 carried by angle plate 19 which is fastened to the upper end of the depending member 15. A plate 16 in which is formed a keyhole shaped slot 17, is carried by the underside of the transverse member 12. The lug 18 is adapted to enter the large end of the keyhole shaped slot 17 and to be slid to the right as viewed in Figure 4 to be engaged by the narrow portion of the slot 17. To maintain the lug in the engaged position a pin 20 carried by the depending member 15 is adapted to engage hole 21 in the plate 16.

A lower horizontally disposed member 22 is attached at its inboard end to the lower end of member 15 by means of hinge 23, and is attached at its outboard end to plate 23, carried by the inner wall of the cabin, by a T-slot and stud arrangement similar to that shown in Figure 4 and hereinbefore described. To brace the supporting structure in a fore and aft direction an adjustable brace member 24 is provided. This brace member is hingedly attached at 25 to the forward side of lower member 22 and extends forwardly and upwardly to the underside of the parcel rack 4 and is attached thereto by means of thumbscrew 27 which engages a nut 26 carried by the parcel rack. A turnbuckle 28 is provided to allow for longitudinal adjustment of the brace member 24 so as to correctly position the partition at its lower edge. A Z section 29 extending longitudinally along the aft side of member 22 is fastened thereto to form a channel in which the lower edge of plywood panel 8 is adapted to rest. Thumbscrews 30 and 31 carried by transverse member 12 and depending member 15 respectively, engage the panel 8 to hold it in place against the supporting structure. The inner edges of the partitions 6 and 7 coincide substantially with the inner sides of the dual seats 2 and 3 so that a doorway 32 is formed therebetween. A pair of curtains 33 and 34 are slidably supported from a track 36, carried by transverse member 12, by means of tabs 35 suspended from track 36 and adapted to slide therealong so that the curtains 33 and 34 form a closure for the doorway 32. A row of snap fasteners 38 is carried by the outer edge of each curtain and is adapted to be fastened to studs 39 carried by the inner edge of each partition 6 and 7. A conventional signal light assembly 39 is fastened above the doorway 32 by means of thumbscrews 40 which extend through the upper transverse member 12 to engage the back of the light assembly. An electrical cord (not shown) to provide current for the light may be plugged into a convenient electrical outlet.

As shown in Figure 2, provision is made within the cabin for alternate locations of the bulkhead. Attaching plates 13 and 23 are carried by the inner wall of the cabin, and plates 41 by the underside of the parcel rack, to provide for attachment of the brace structure in the desired location. Obviously any number of alternate locations may be provided depending on the length of that portion of the cabin which has a constant cross section. Since the attaching points are merely small flat plates they are relatively inconspicuous and do not detract from the appearance of the interior of the cabin.

Installation of the bulkhead hereinbefore described is rapid and simple. It is necessary only to install the upper transverse member 12 in place by tightening thumbscrews 14. The lower members 15 and 22 are then connected at their respective ends to the transverse member 12 and the attaching plate 23 at the side of the cabin by means of the rapid fastening arrangement shown in Figure 4 and hereinbefore described. Brace member 24 is then swung upwardly against the parcel rack 4 and thumbscrew 27 tightened to hold it in place. Each of the partitions 6 and 7 may then be slid into place over the parcel racks 4 and 5, the lower edge of the panel 8 being dropped into place in the channel formed by the section 29 along the aft side of the lower member 22. The lower edge of the flexible portion of the partitions is then fastened to the studs along the lower rear edges of the dual seats 2 and 3. Curtains 33 and 34 may then be suspended in place in the doorway by engaging the tabs 35 in the track 36 and attaching the snap fasteners 38 to the studs 39 along the edges of the doorway 32. Signal light 39 is then placed in position over the doorway and fastened in place by means of thumbscrews 40.

The procedure necessary for the installation of the bulkhead is seen to be obviously rapid and simple and may be accomplished in a very short time by even the most inexperienced personnel. Removal of the bulkhead may be accomplished with the same facility, and the construction of its components allows them to be folded for storage so that the disassembled bulkhead may be stowed in a very small space, thus allowing the bulkhead, if it is so desired, to be carried in the aircraft itself when not in use.

A partition constructed and installed in accordance with the present invention is attractive to the eye and gives the appearance of being the actual forward bulkhead of the passenger cabin, while at the same time, it completely harmonizes with the decorative scheme of the cabin interior. No tools are required for its installation, and the alternate locations provided, coupled with the ease of installation and removal, make possible the most efficient utilization of space within any aircraft used for the purpose of carrying mail or cargo in addition to passengers, without detracting from the appearance of the passenger compartment or destroying the decorative scheme of the aircraft interior.

While but one form of the invention is described and shown, it should be understood that the invention is not confined to the precise details of construction herein set forth, as it is apparent that many changes and variations may be made without departing from the scope of the invention as defined by the appended claims, and no limitation is intended by the phraseology of the foregoing description or the illustrations in the accompanying drawings.

We claim as our invention:

1. In an aircraft having a cabin including a plurality of seats in orderly arrangement along opposite sides thereof, a supporting brace structure comprising an upper transverse member, and a pair of lower brace members depending therefrom and spaced laterally inwardly from the sides of said cabin, attaching means provided on said cabin and said brace structure for detachably securing said brace structure to the upper portion of said cabin at any one of a plurality of locations spaced longitudinally along said cabin, a pair of partition members supported by said brace structure and disposed at opposite sides of said cabin to form a generally rectangular doorway therebetween, said partition members each comprising an upper panel portion detachably secured to one of said brace members, and a lower flexible portion supported at its upper end by said panel portion, means detachably fastening the lower end of each said flexible portion to said cabin to cause the lower portion thereof to lie snugly against the rear side of a pair of said seats, a pair of curtains slidably supported by said transverse member to form a closure for said doorway, and means detachably securing each said curtain to its adjacent partition member along one edge thereof.

2. Removable bulkhead means for an aircraft cabin comprising an upper member extending transversely across the said cabin adjacent the ceiling thereof, means detachably securing said upper member to said cabin, a pair of vertical members detachably secured at one end to said upper member and depending therefrom, a pair of lower transverse members each hinged at one end to the lower ends of said vertical members and detachably secured at the other end to the interior wall of said cabin, a pair of adjustable brace members each hinged at one end to the forward side of one of said lower transverse members and detachably secured to said cabin at the other end to brace said vertical members against swinging movement, means forming a channel extending along the aft side of and carried by each of said lower transverse members, a pair of oppositely disposed partition members each comprising an upper panel portion and a lower flexible portion depending therefrom, the lower edge of said upper panel portion being adapted to rest in said channel, each said panel member being detachably secured to said upper member and one of said vertical members, and means detachably securing said flexible portion of each said partition member at its lower edge to said cabin, said partition members being disposed at opposite sides of said cabin to form a generally rectangular doorway therebetween, and curtain means slidably supported from said upper member to form a closure for said doorway.

3. A removable bulkhead for an aircraft cabin comprising a collapsible brace structure, means for attaching said brace structure to the upper interior surface of said cabin, a removable partition member detachably supported from said brace structure at each side of said cabin, said partitions each comprising an upper panel portion and a lower flexible portion attached thereto and extending downwardly therefrom and secured to the lower portion of said cabin, said partitions forming a generally rectangular doorway therebetween, and curtain means suspended from said brace structure to form a closure for said doorway.

4. A removable bulkhead for an aircraft cabin containing a plurality of seats in orderly arrangement along each side of said cabin, comprising a collapsible brace structure, means attaching said brace structure to the upper interior surface of said cabin, a removable partition member supported by said brace structure at each side of said cabin, each said partition member comprising an upper panel portion and a lower flexible portion attached thereto and extending downwardly to the lower rear portion of said seats, means attaching the lower ends of said flexible portions to the lower rear portions of those seats located in said cabin immediately forward of said partitions, said partition members forming a generally rectangular doorway therebetween, and curtain means slidably suspended from said brace structure to form a closure for said doorway.

5. A removable bulkhead for an aircraft cabin containing a plurality of seats in orderly arrangement along each side of said cabin, comprising a collapsible brace structure, means attaching said brace structure to the interior surface of said cabin, a removable partition member supported by said brace structure at each side of said cabin, each said partition member comprising an upper panel portion and a lower flexible portion attached thereto, means for attaching the lower end of said flexible portion to a pair of said seats, said partition members forming a generally rectangular doorway therebetween, a pair of curtains slidably suspended from said brace structure to form a closure for said doorway, and means attaching one side of each said curtain to the adjacent edge of said doorway.

6. Removable bulkhead means for an aircraft cabin comprising a supporting brace structure, attaching means for detachably securing said brace structure to the interior wall of said cabin at any one of a plurality of longitudinal locations, a pair of oppositely disposed partition members each comprising an upper rigid panel portion and a lower flexible portion depending therefrom, the outer edges thereof being shaped to match the contour of the side walls of said cabin, means detachably securing said partition members to said brace structure and securing the flexible portion to said cabin adjacent the lower portion thereof, the inner edges of said partition members being spaced to form a doorway therebetween, and a pair of curtains slidably suspended from said brace structure to form a closure for said doorway.

7. A removable and collapsible bulkhead for an aircraft cabin provided with a row of seats extending transversely of the aircraft and having a center aisle between two of said seats comprising a supporting framework including an upper transverse beam provided with means for readily detachably connecting the ends of the beam to the cabin overhead at opposite sides thereof substantially above the backs of said seats; said brace structure also including two foldable systems of links, one for each side of said aisle, each including essentially a vertical link and a horizontal link hingedly connected together at their ends and each having means for ready detachable connection of the opposite end of its vertical link to said beam at a location adjacent to said aisle, and means for ready detachable connection of the opposite end of its horizontal link to the side of said cabin adjacent the top of said row of seats, said framework further including means connected to said horizontal link near the hinge point and to the cabin at a location spaced from the seat back in a fore-and-aft direction for bracing said links against fore-and-aft swinging movement; and a pair of thin, removable, readily stowable panels detachably supported essentially on said framework and disposed one at each side of said cabin above the corresponding seats, said panels being dimensioned to fill the cabin area above said seats and to form between them a passageway of substantially the same width as said aisle.

References Cited in the file of this patent

UNITED STATES PATENTS

| | | |
|---|---|---|
| 2,081,529 | Canney | May 25, 1937 |
| 2,396,039 | Burton et al. | Mar. 5, 1946 |
| 2,605,064 | Davis | July 29, 1952 |